US012695262B2

(12) United States Patent
Kimura

(10) Patent No.: US 12,695,262 B2
(45) Date of Patent: Jul. 28, 2026

(54) CONNECTING METHOD, CONNECTING MEMBER, WIRING MEMBER, AND GARMENT

(71) Applicant: Japan Aviation Electronics Industry, Limited, Tokyo (JP)

(72) Inventor: Akira Kimura, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 353 days.

(21) Appl. No.: 18/442,545

(22) Filed: Feb. 15, 2024

(65) Prior Publication Data

US 2024/0347994 A1 Oct. 17, 2024

(30) Foreign Application Priority Data

Apr. 12, 2023 (JP) ................................ 2023-064787

(51) Int. Cl.
*H01R 43/28* (2006.01)
*A41D 1/00* (2018.01)
*H01R 12/77* (2011.01)

(52) U.S. Cl.
CPC ............. *H01R 43/28* (2013.01); *A41D 1/005* (2013.01); *H01R 12/771* (2013.01)

(58) Field of Classification Search
CPC ....... H01R 43/28; H01R 12/771; A41D 1/005
See application file for complete search history.

(56) References Cited

U.S. PATENT DOCUMENTS 4,808,112 A * 2/1989 Wood ..................... H05K 3/365 439/67
5,326,272 A * 7/1994 Harhen .................. A61N 1/048 600/394
6,695,629 B1 * 2/2004 Mayer .................... H05K 7/142 361/752
10,630,004 B2 * 4/2020 Hashiguchi ............ H01R 12/79
11,205,870 B2 * 12/2021 Matsuo .................. H01R 12/69
2002/0160648 A1 * 10/2002 Bulmer ................ H01R 12/675 439/393
2006/0280322 A1 * 12/2006 Abe ....................... H01R 13/24 381/300
2007/0167089 A1 * 7/2007 Gobron ................ H01R 12/777 439/860
2019/0027842 A1 1/2019 Hashiguchi
2021/0075135 A1 * 3/2021 Komoto ................. H01R 12/59
(Continued)

FOREIGN PATENT DOCUMENTS

JP 2005122901 A 5/2005

*Primary Examiner* — Harshad C Patel
(74) *Attorney, Agent, or Firm* — MUNCY, GEISSLER, OLDS & LOWE, P.C.

(57) ABSTRACT

A connecting method includes disposing a wire along a surface of a mounting object, disposing a first insulator having a pair of outer lateral surfaces separately facing in opposite directions from each other between the surface of the mounting object and a middle part of the wire, bending the middle part of the wire to extend along the pair of outer lateral surfaces of the first insulator, fitting a second insulator to the first insulator such that the middle part of the wire that is bent and part of the first insulator pass through and protrude from a through hole of the second insulator, and cutting and removing the middle part of the wire and the part of the first insulator protruding from the through hole of the second insulator.

12 Claims, 16 Drawing Sheets

(56) References Cited

U.S. PATENT DOCUMENTS

| | | | | |
|---|---|---|---|---|
| 2021/0075146 | A1 | 3/2021 | Matsuo et al. | |
| 2021/0098898 | A1* | 4/2021 | Komoto | H01R 43/20 |
| 2021/0104824 | A1* | 4/2021 | Hashiguchi | A44C 5/14 |
| 2022/0158373 | A1* | 5/2022 | Komoto | H01R 13/502 |
| 2022/0302617 | A1* | 9/2022 | Komoto | H01R 12/592 |
| 2023/0420902 | A1* | 12/2023 | Kimura | H01R 12/592 |
| 2024/0178602 | A1* | 5/2024 | Nakamura | H01R 12/592 |

* cited by examiner

CONNECTING METHOD, CONNECTING MEMBER, WIRING MEMBER, AND GARMENT

BACKGROUND OF THE INVENTION

The present invention relates to a connecting method and a connecting member, in particular, to a connecting method and a connecting member for electrically connecting a wire conductor disposed along a surface of a mounting object to a connecting conductor.

The present invention also relates to a wiring member including a wire conductor and a connecting member, and a garment on which the wiring member is mounted.

As a connector connected to a flexible conductor, for instance, JP 2005-122901 A discloses a connector 1 shown in FIG. 35. The connector 1 is mounted on a flexible flat cable 2 and includes a connecting conductor 4 made of a metal plate having a piercing piece 3, and a metal receiving groove plate 6 provided with a receiving groove 5.

When the piercing piece 3 of the connecting conductor 4 pierces the flat cable 2 while the connecting conductor 4 and the receiving groove plate 6 are aligned such that the piercing piece 3 is inserted along one end of the receiving groove 5, a wire conductor 7 disposed inside the flat cable 2 is sheared by the piercing piece 3. With insertion of the piercing piece 3, a sheared part of the wire conductor 7 is caught in a gap formed between the other end of the receiving groove 5 and the piercing piece 3 to constitute a stretched cut part 7A contacting the piercing piece 3. As a result, the connecting conductor 4 and the wire conductor 7 are electrically connected to each other.

As shown in FIG. 35, with the piercing piece 3 piercing the flat cable 2, the wire conductor 7 is sheared and divided into two conductor parts separately disposed on opposite sides of the piercing piece 3. Meanwhile, of the two conductor parts thus divided, only one conductor part having the stretched cut part 7A is electrically connected to the connecting conductor 4 to form an electric circuit, whereas the other conductor part that does not include the stretched cut part 7A does not contribute to the electric circuit and thus becomes a useless part.

Accordingly, for connecting a plurality of connecting conductors 4 to a plurality of wire conductors 7, it is necessary to dispose connecting conductors 4 and wire conductors 7 on a one-to-one basis, and thus there is a problem in that a lot of work is required to form an electric circuit with multiple systems.

SUMMARY OF THE INVENTION

The present invention has been made to overcome the conventional problem as above and aims at providing a connecting method and a connecting member capable of electrically connecting a plurality of connecting conductors to a plurality of wire conductors with ease.

The present invention also aims at providing a wiring member including a wire conductor and a connecting member, and a garment on which the wire conductor is mounted.

A connecting method according to the present invention is one for electrically connecting a pair of wire conductors disposed along a surface of a mounting object to a pair of connecting conductors, the connecting method comprising:

disposing a wire along the surface of the mounting object;

disposing a first insulator between the surface of the mounting object and a middle part of the wire, the first insulator including a pair of outer lateral surfaces separately facing in opposite directions from each other along the surface of the mounting object;

bending the middle part of the wire to extend along the pair of outer lateral surfaces of the first insulator;

fitting a second insulator to the first insulator such that the middle part of the wire that is bent and part of the first insulator pass through and protrude from a through hole of the second insulator, whereby the middle part of the wire is sandwiched between the pair of outer lateral surfaces of the first insulator and the pair of connecting conductors exposed on a pair of inner lateral surfaces of the through hole of the second insulator to make contact with the pair of connecting conductors; and cutting and removing the middle part of the wire and the part of the first insulator protruding from the through hole of the second insulator, whereby the wire is divided into two halves to form the pair of wire conductors, and the pair of wire conductors are electrically connected to the pair of connecting conductors.

A connecting member according to the present invention is one mounted on a mounting object and electrically connecting a pair of wire conductors disposed along a surface of the mounting object to a pair of connecting conductors, the connecting member comprising:

a first insulator disposed on the surface of the mounting object and including a pair of outer lateral surfaces separately facing in opposite directions from each other along the surface of the mounting object;

a second insulator including a through hole through which at least part of the first insulator passes; and the pair of connecting conductors retained by the second insulator, wherein the through hole of the second insulator includes a pair of inner lateral surfaces opposing the pair of outer lateral surfaces of the first insulator, the pair of connecting conductors are exposed on the pair of inner lateral surfaces of the through hole, the pair of wire conductors are bent to extend along the pair of outer lateral surfaces of the first insulator and are sandwiched between the pair of outer lateral surfaces of the first insulator and the pair of connecting conductors exposed on the pair of inner lateral surfaces of the through hole of the second insulator to be thereby electrically connected to the pair of connecting conductors, and tip end surfaces of the pair of wire conductors that are bent to extend along the pair of outer lateral surfaces of the first insulator and a tip end surface of the first insulator that has passed through the through hole of the second insulator are situated at a same height or close heights to each other in a direction along the pair of outer lateral surfaces of the first insulator.

A wiring member according to the present invention is one mounted on a mounting object, the wiring member comprising:

at least a pair of wire conductors; and the connecting member.

A garment according to the present invention serves as the mounting object on which the wiring member is mounted.

DETAILED DESCRIPTION OF THE INVENTION

Embodiments of the present invention are described below based on the accompanying drawings.

Embodiment 1

Figure 1:
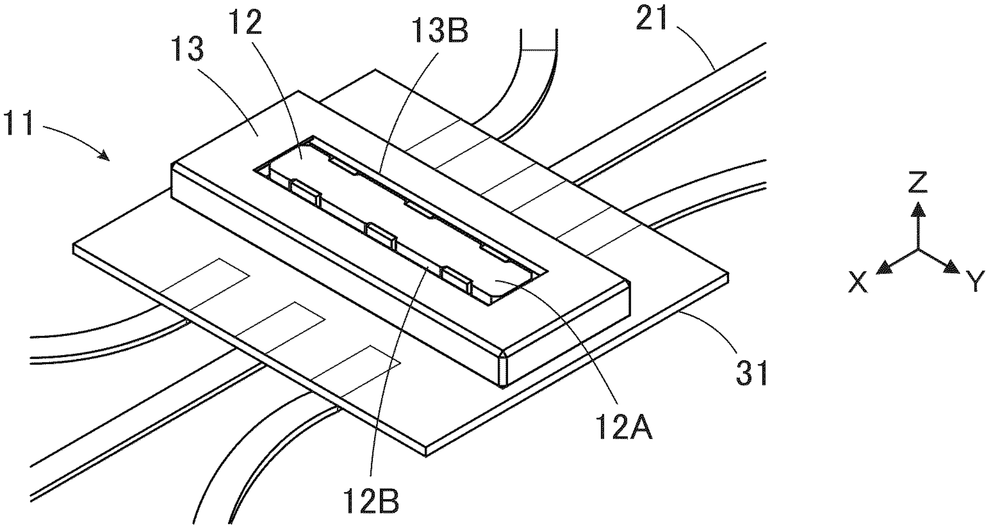
FIG. 1 is a perspective view showing a connecting member according to Embodiment 1 of the invention.

FIG. 1 shows a connecting member 11 according to Embodiment 1. The connecting member 11 is to be mounted on a mounting object constituted of, for example, a garment and is used to electrically connect pairs of wire conductors 21 disposed along a surface of the mounting object to pairs of connecting conductors.

The connecting member 11 includes a first insulator 12, a second insulator 13 fitted to the first insulator 12, and a flexible substrate 31 retained by the first insulator 12 and the second insulator 13. The second insulator 13 is fitted to the first insulator 12 while being disposed on the flexible substrate 31.

The flexible substrate 31 includes pairs of connecting conductors, and the pairs of wire conductors 21 are electrically connected to the pairs of connecting conductors of the flexible substrate 31 between the first insulator 12 and the second insulator 13.

For convenience, the flexible substrate 31 is defined as extending along an XY plane, the direction in which the pairs of wire conductors 21 extend toward the connecting member 11 is referred to as “X direction,” and the direction perpendicular to an XY plane is referred to as “Z direction.” The second insulator 13 is disposed on the +Z directional surface of the flexible substrate 31.

In FIG. 1, three pairs of wire conductors 21 are shown as the pairs of wire conductors 21, and the three pairs of wire conductors 21 are connected to three pairs of connecting conductors of the flexible substrate 31.

Figure 2:
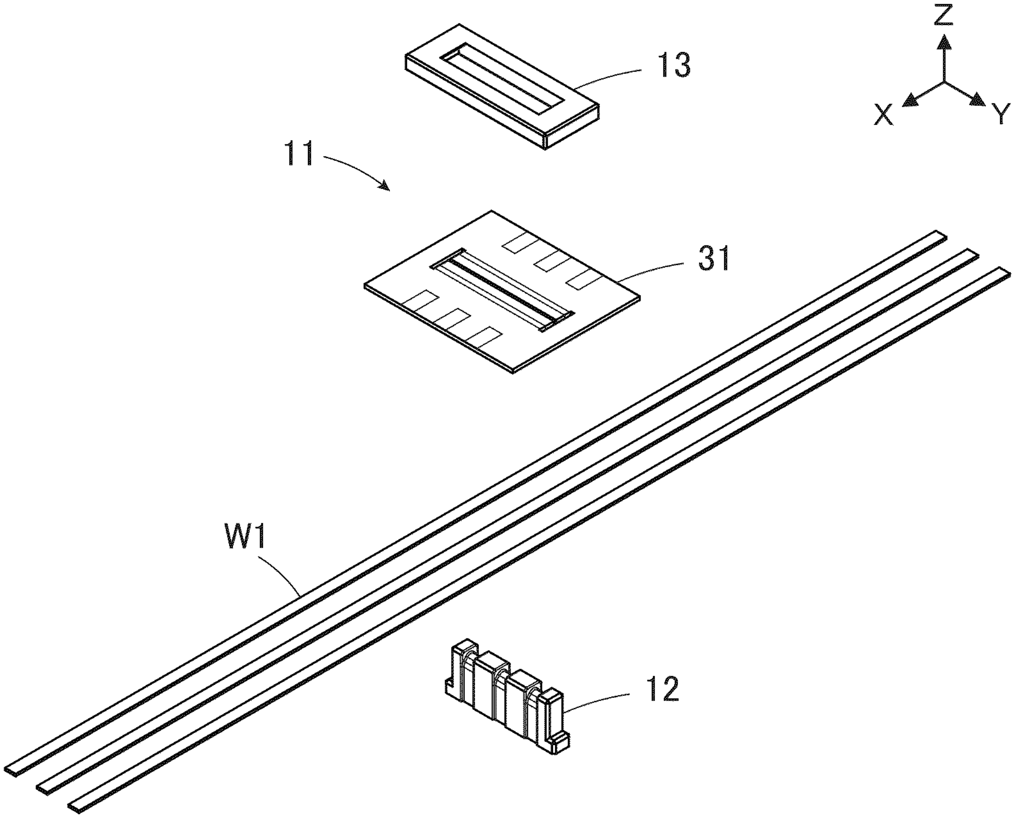
FIG. 2 is an assembly view of the connecting member according to Embodiment 1.

FIG. 2 shows an assembly view of the connecting member 11. Three wires W1 are disposed on the +Z direction side of the first insulator 12. The three wires W1 are aligned in the Y direction with predetermined intervals therebetween and each extend in the X direction. As the wire W1, use can be made of, for instance, a fibrous wire formed from a conductive thread woven or knitted therein.

The flexible substrate 31 is disposed on the +Z direction side of the three wires W1, and the second insulator 13 is disposed further on the +Z direction side of the flexible substrate 31.

Figure 3:
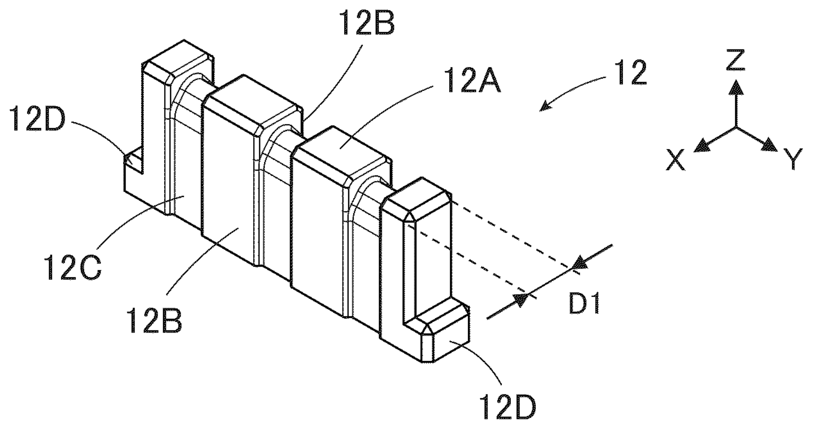
FIG. 3 is a perspective view showing a first insulator used in the connecting member of Embodiment 1.

As shown in FIG. 3, the first insulator 12 is made of, for example, an insulating resin, and includes a body portion 12A of flat plate shape extending in the +Z direction along a YZ plane. The body portion 12A includes a pair of outer lateral surfaces 12B separately facing in the +X direction and the −X direction, and three wire conductor accommodation grooves 12C are formed in the pair of outer lateral surfaces 12B, the wire conductor accommodation grooves 12C being aligned in the Y direction with predetermined intervals therebetween and each extending along the Z direction. The wire conductor accommodation grooves 12C accommodate the wires W1 when the connecting member 11 is assembled and each have a groove width corresponding to the width of the wire W1 and a groove depth smaller than the thickness dimension of the wire W1.

The body portion 12A has a thickness D1 in the X direction.

In addition, the body portion 12A is provided, at opposite end surfaces in the Y direction and at the −Z directional end, separately with projections 12D projecting in the Y direction.

Figure 4:
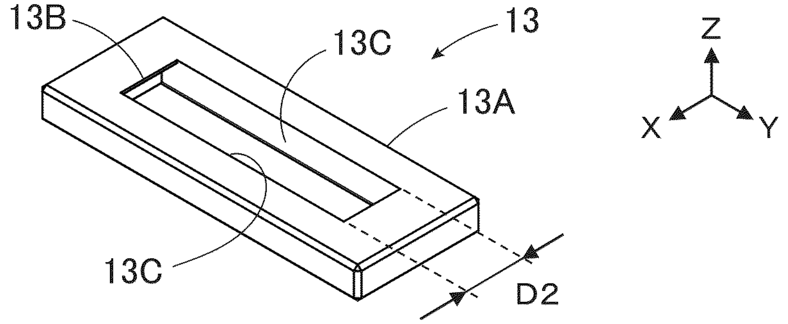
FIG. 4 is a perspective view of a second insulator used in the connecting member of Embodiment 1 when viewed from an obliquely upper position.

As shown in FIG. 4, the second insulator 13 is made of, for example, an insulating resin, and includes a body portion 13A of flat plate shape extending along an XY plane. The body portion 13A is provided with a through hole 13B penetrating the body portion 13A in the Z direction and extending in the Y direction. The through hole 13B includes a pair of inner lateral surfaces 13C opposing each other in the X direction and each extending along a YZ plane, and has a width D2 in the X direction. The width D2 in the X direction of the through hole 13B has a slightly larger dimension than the thickness D1 in the X direction of the body portion 12A of the second insulator 12 such that the +Z directional part of the body portion 12A can pass through the through hole 13B in the Z direction.

Figure 5:
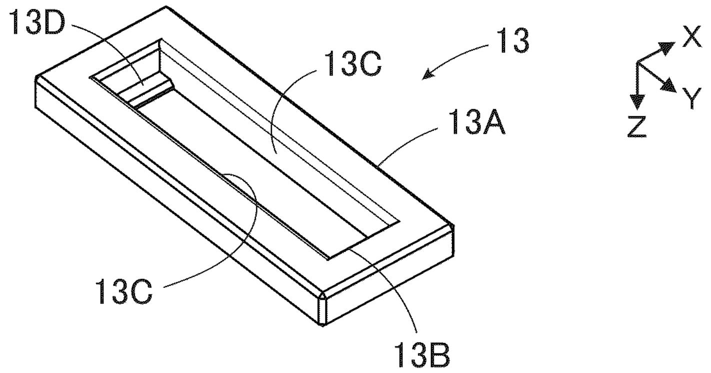
FIG. 5 is a perspective view of the second insulator used in the connecting member of Embodiment 1 when viewed from an obliquely lower position.

As shown in FIG. 5, the body portion 13A is also provided with step portions 13D each facing in the −Z direction and separately formed at opposite ends in the Y direction of the through hole 13B.

Figure 6:
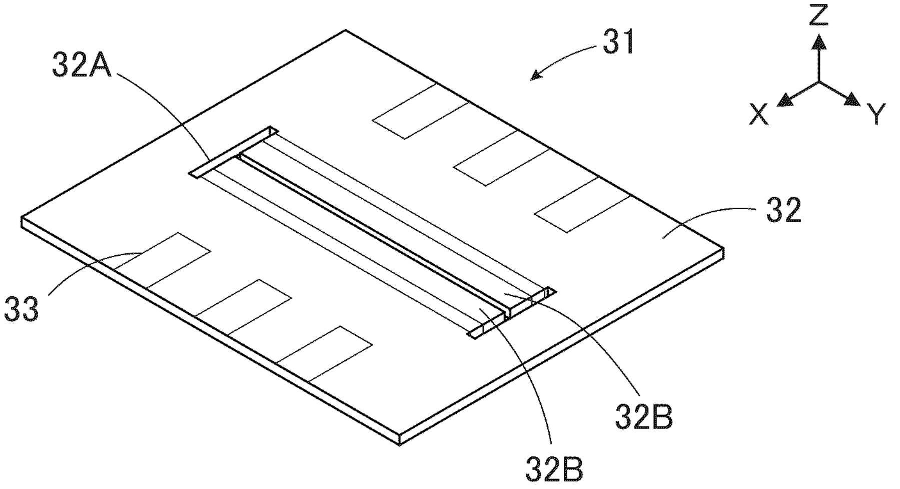
FIG. 6 is a perspective view of a flexible substrate used in the connecting member of Embodiment 1 when viewed from an obliquely upper position.

As shown in FIG. 6, the flexible substrate 31 includes a flexible insulating base 32 of sheet shape, and the insulating base 32 is provided with a H-shaped opening portion 32A extending long in the Y direction. The opening portion 32A is formed of a cut penetrating the insulating base 32 in the Z direction and has a size corresponding to the through hole 13B of the second insulator 13. Owing to the opening portion 32A, a pair of fold portions 32B are formed to oppose each other in the X direction and each extend in the Y direction. The pair of fold portions 32B are to be folded into the through hole 13B of the second insulator 13 when the connecting member 11 is assembled.

Figure 7:
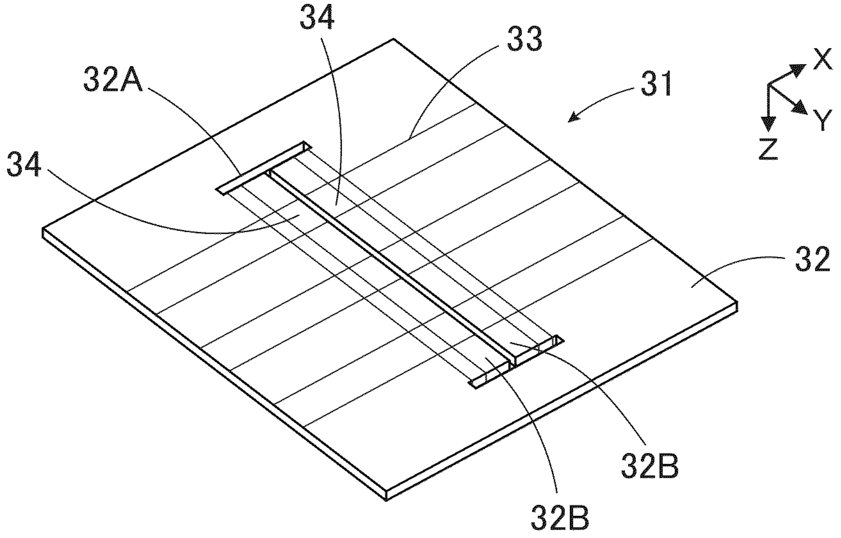
FIG. 7 is a perspective view of the flexible substrate used in the connecting member of Embodiment 1 when viewed from an obliquely lower position.

As shown in FIG. 7, the insulating base 32 is provided on its back surface facing in the −Z direction with three pairs of flexible conductors 33 each extending in the X direction so as to form a linear pattern. Two flexible conductors 33 constituting each pair are separately disposed on the +X direction side and the −X direction side of the opening portion 32A across the opening portion 32A and are both situated on a single straight line extending in the X direction. The flexible conductors 33 separately extend to reach the pair of fold portions 32B, and three pairs of connecting conductors 34 formed of the flexible conductors 33 are separately disposed on the back surfaces facing in the −Z direction of the fold portions 32B.

As shown in FIG. 6, also on the front surface facing in the +Z direction of the insulating base 32, three pairs of flexible conductors 33 are formed near the +X directional end and the −X directional end of the insulating base 32. The three pairs of flexible conductors 33 formed on the front surface of the insulating base 32 are each electrically connected to the corresponding flexible conductor 33 on the back surface of the insulating base 32 through an interior of the insulating base 32.

Figure 8:
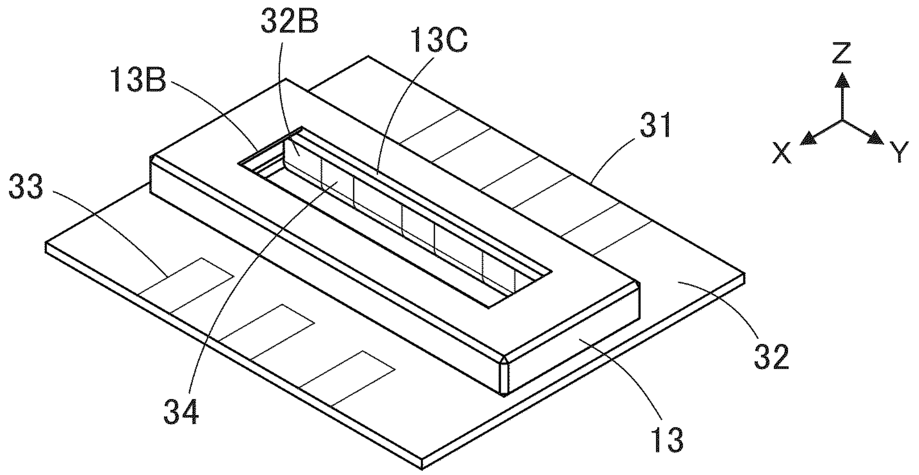
FIG. 8 is a perspective view showing a state where a pair of fold portions of the flexible substrate are folded into a through hole of the second insulator in the connecting member of Embodiment 1 when viewed from an obliquely upper position.
Figure 9:
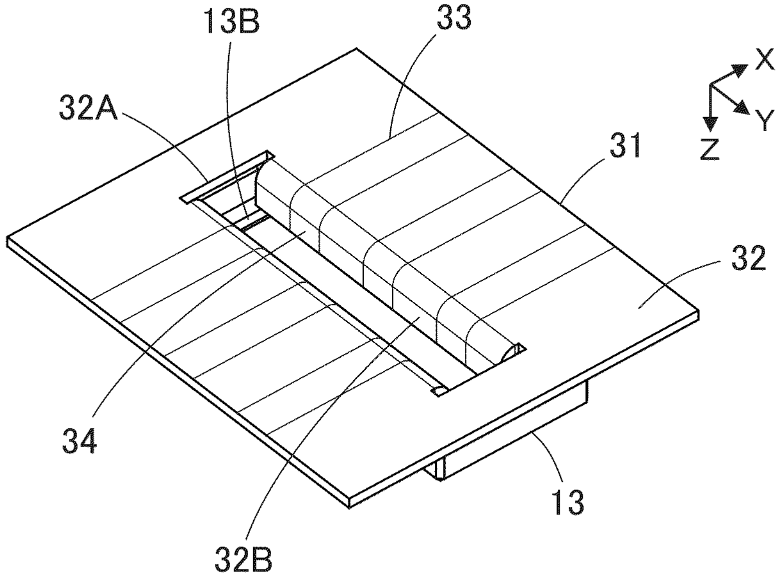
FIG. 9 is a perspective view showing the state where the pair of fold portions of the flexible substrate are folded into the through hole of the second insulator in the connecting member of Embodiment 1 when viewed from an obliquely lower position.

When the connecting member 11 is assembled, the body portion 12A of the first insulator 12 is inserted in the through hole 13B of the second insulator 13 from the −Z direction with the flexible substrate 31 intervening therebetween. In this process, as shown in FIGS. 8 and 9, the pair of fold portions 32B of the flexible substrate 31 are pressed by the body portion 12A of the first insulator 12 to be thereby positioned on the pair of inner lateral surfaces 13C of the through hole 13B of the second insulator 13. As a result, the three pairs of connecting conductors 34 disposed on the back surfaces of the pair of fold portions 32B are exposed on the pair of inner lateral surfaces 13C of the through hole 13B of the second insulator 13.

Next, described is a connecting method for connecting the three pairs of wire conductors 21 to the three pairs of connecting conductors 34 by mounting the connecting member 11 according to Embodiment 1 on a garment C serving as a mounting object.

Figure 10:
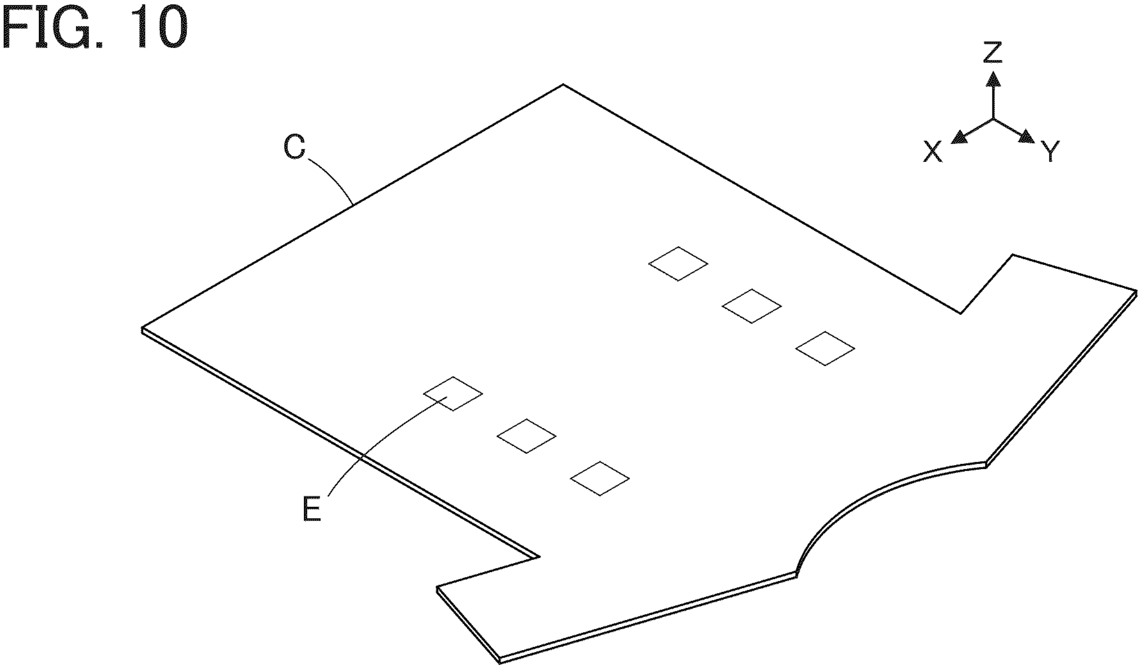
FIG. 10 is a perspective view showing a garment used in Embodiment 1.

As shown in FIG. 10, first, the garment C on whose surface six electrodes E are disposed is prepared. The six electrodes E constitute three pairs of electrodes E, each pair of which consists of two electrodes E disposed on the same position in the Y direction.

Figure 11:
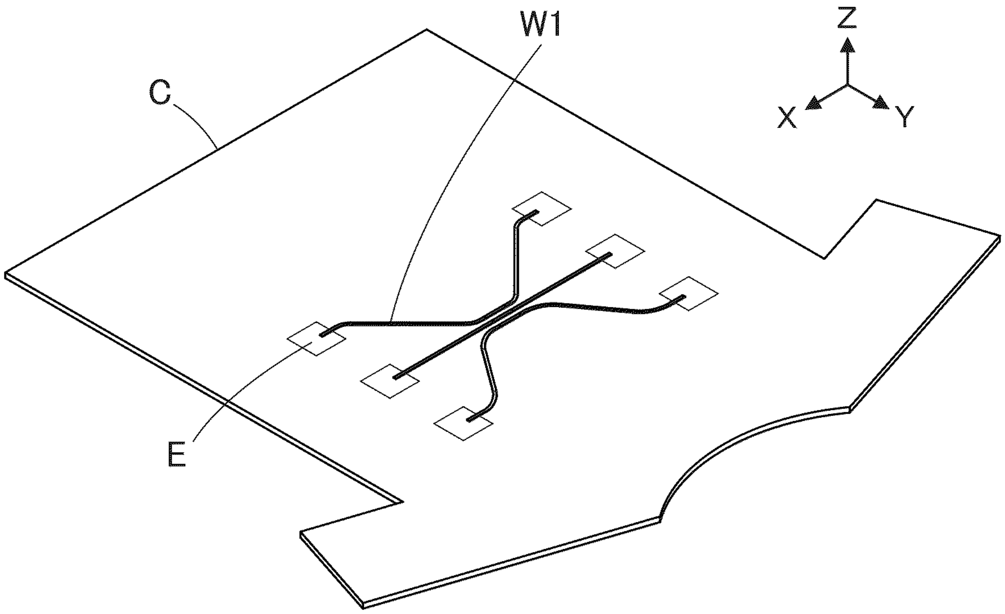
FIG. 11 is a perspective view showing the garment to which a plurality of wires are attached in Embodiment 1.

Next, as shown in FIG. 11, opposite ends of three wires W1 are separately connected to the three pairs of electrodes E of the garment C. The three wires W1 correspond to the three pairs of electrodes E, and opposite ends of each wire W1 are connected to the corresponding pair of electrodes E by, for example, soldering. At this time, a middle part of each wire W1 is not fixed to the garment C and is thus movable, and middle parts of the three wires W1 are disposed to be close to one another.

Figure 12:
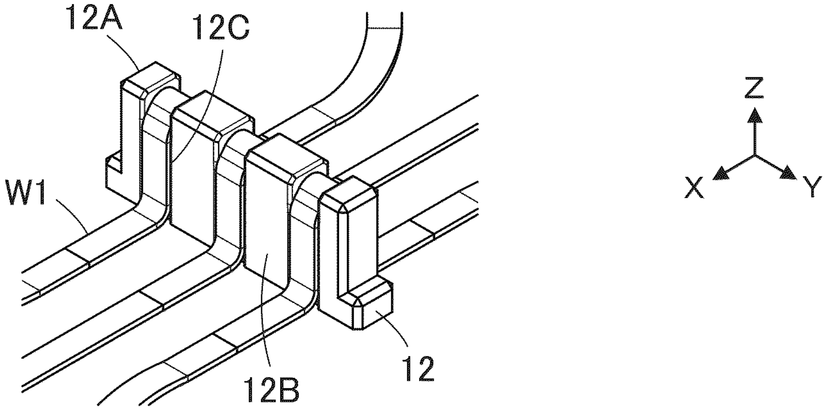
FIG. 12 is a perspective view showing the first insulator disposed between a surface of the garment and middle parts of the plurality of wires in Embodiment 1.

In addition, as shown in FIG. 12, the first insulator 12 is inserted between the middle parts of the three wires W1 that are not fixed to the garment C and the surface of the garment C, and the middle parts of the three wires W1 are bent to extend along the pair of outer lateral surfaces 12B of the first insulator 12 and are separately accommodated in the corresponding wire conductor accommodation grooves 12C of the body portion 12A.

Figure 13:
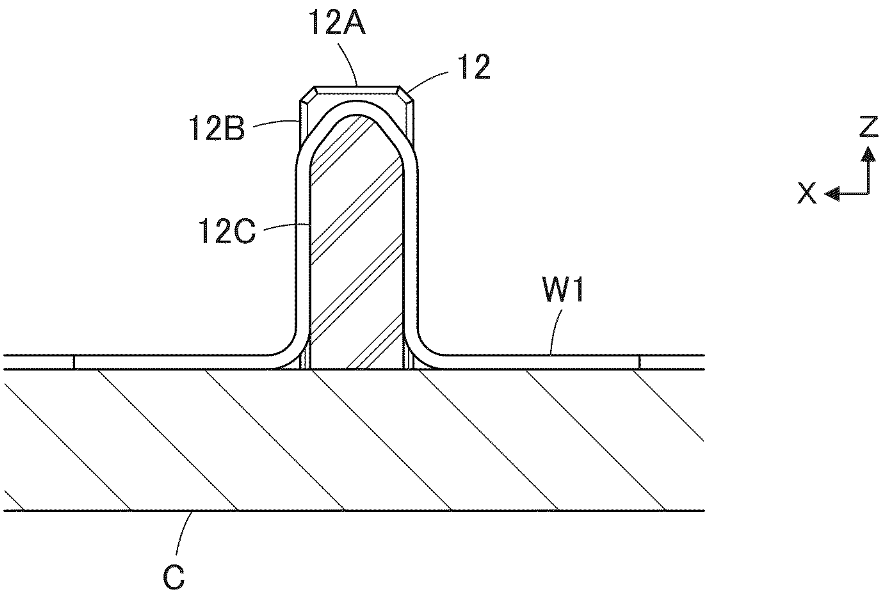
FIG. 13 is a cross-sectional view showing the first insulator disposed between the surface of the garment and the middle parts of the plurality of wires in Embodiment 1.

The wire conductor accommodation groove 12C has a smaller depth than the thickness dimension of the wire W1, and therefore, as shown in FIG. 13, the surface of the wire W1 accommodated in the wire conductor accommodation groove 12C protrudes to the outside in the X direction from the pair of outer lateral surfaces 12B of the body portion 12A.

In this state, the flexible substrate 31 is disposed on the +Z direction side of the first insulator 12, and, in addition, the second insulator 13 is pressed in the −Z direction toward the first insulator 12 from the +Z direction side of the flexible substrate 31.

Figure 14:
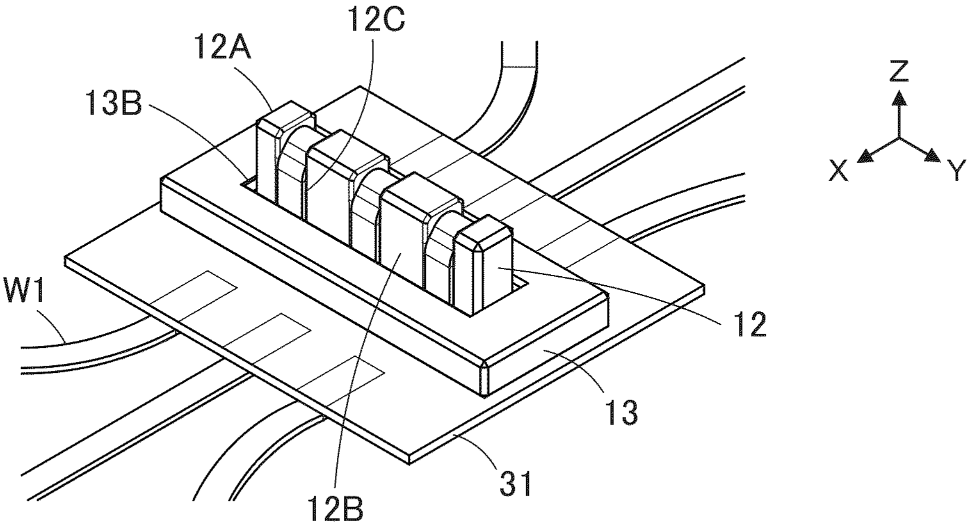
FIG. 14 is a perspective view showing a state where the second insulator is fitted to the first insulator in Embodiment 1.

Hence, the pair of fold portions 32B of the flexible substrate 31 are folded into the through hole 13B of the second insulator 13 by the body portion 12A of the first insulator 12 as shown in FIGS. 8 and 9, and the +Z directional part of the body portion 12A of the first insulator 12 passes through the opening portion 32A of the flexible substrate 31 and the through hole 13B of the second insulator 13 to project on the +Z direction side of the second insulator 13 as shown in FIG. 14.

Since the step portions 13D of the second insulator 13 shown in FIG. 5 abut onto the projections 12D of the first insulator 12 shown in FIG. 3, the position of the second insulator 13 in the Z direction with respect to the first insulator 12 is restricted, and the second insulator 13 is fitted to the first insulator 12.

At this time, as shown in FIGS. 8 and 9, the three pairs of connecting conductors 34 disposed on the back surfaces of the pair of fold portions 32B of the flexible substrate 31 are exposed on the pair of inner lateral surfaces 13C of the through hole 13B of the second insulator 13, and as shown in FIG. 13, the surface of each wire W1 accommodated in the wire conductor accommodation groove 12C of the first insulator 12 protrudes to the outside in the X direction from the pair of outer lateral surfaces 12B of the body portion 12A.

Figure 15:
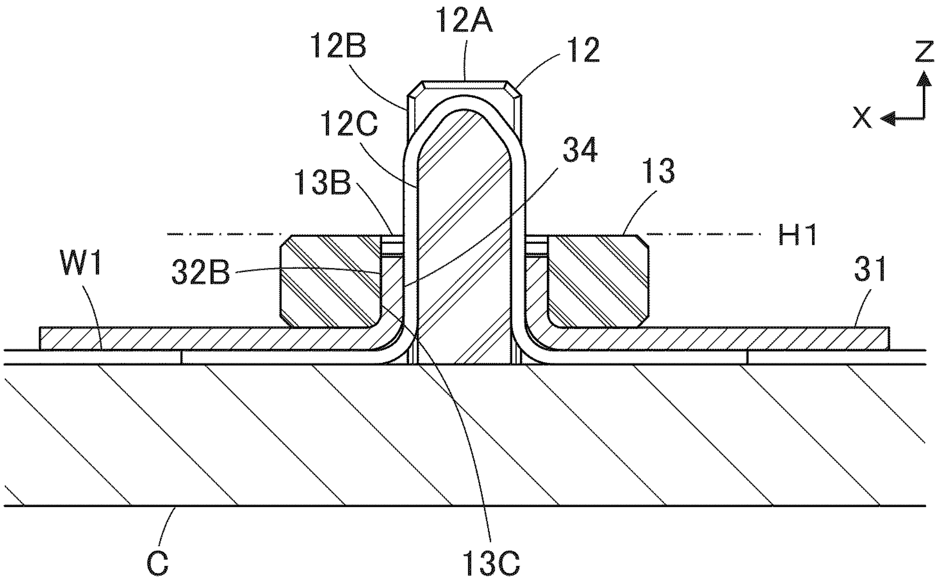
FIG. 15 is a cross-sectional view showing the state where the second insulator is fitted to the first insulator in Embodiment 1.

With this constitution, as shown in FIG. 15, the middle part of each wire W1 is sandwiched between the pair of outer lateral surfaces 12B of the body portion 12A of the first insulator 12 and the pair of connecting conductors 34 exposed on the pair of inner lateral surfaces 13C of the through hole 13B of the second insulator 13, makes contact with the pair of connecting conductors 34 with a predetermined contact pressure, and is electrically connected to the pair of connecting conductors 34.

In this state, the body portion 12A of the first insulator 12 and the middle parts of the three wires W1 that are bent to extend along the pair of outer lateral surfaces 12B of the body portion 12A are cut at a height H1 of the +Z directional surface of the second insulator 13. This process of cutting the body portion 12A and the three wires W1 can be carried out by a single step using, for example, a nipper or another cutting tool.

The +Z directional part of the body portion 12A of the first insulator 12 and the middle parts of the three wires W1 protruding on the +Z direction side of the second insulator 13 are cut and removed in this manner, and the connecting member 11 shown in FIG. 1 is thus assembled.

Figure 16:
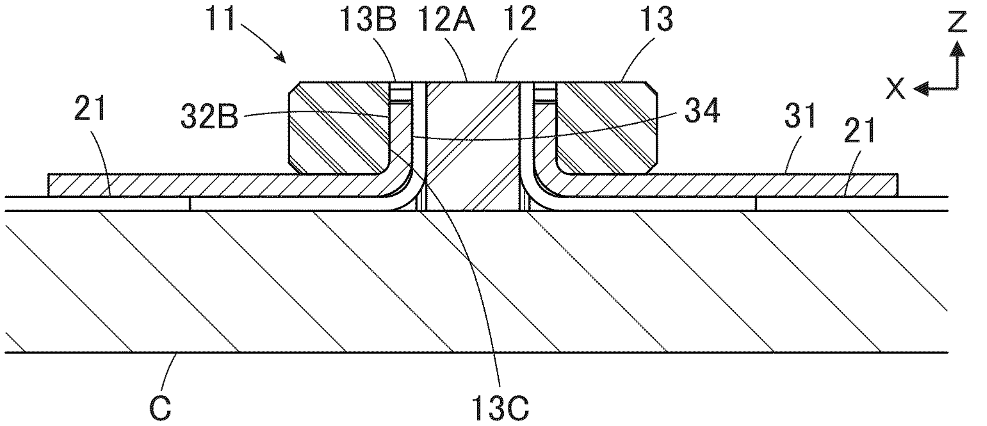
FIG. 16 is a cross-sectional view showing the connecting member of Embodiment 1.

Since the middle parts of the three wires W1 bent to extend along the pair of outer lateral surfaces 12B of the body portion 12A of the first insulator 12 and protruding on the +Z direction side of the second insulator 13 are cut and removed, the three wires W1 are each divided into two halves separately situated on the +X direction side and the −X direction side of the first insulator 12 to thereby form the wire conductor 21 disposed on the +X direction side of the first insulator 12 and the wire conductor 21 disposed on the −X direction side of the first insulator 12 as shown in FIG. 16. In other words, three pairs of the wire conductors 21 are formed.

The wire conductor 21 disposed on the +X direction side is electrically connected to the connecting conductor 34 exposed on the +X directional inner lateral surface 13C of the through hole 13B of the second insulator 13, while the wire conductor 21 disposed on the −X direction side is electrically connected to the connecting conductor 34 exposed on the −X directional inner lateral surface 13C of the through hole 13B of the second insulator 13.

By using the three wires W1 to assemble the connecting member 11 as described above, the three pairs of connecting conductors 34 can be electrically connected to the three pairs of wire conductors 21 with ease.

Since part of the body portion 12A of the first insulator 12 and middle parts of the three wires W1 protruding on the +Z direction side of the second insulator 13 are cut and removed, as shown in FIG. 1, tip end surfaces, facing in the +Z direction, of the pair of wire conductors 21 that are bent to extend along the pair of outer lateral surfaces 12B of the first insulator 12 and a tip end surface, facing in the +Z direction, of the body portion 12A of the first insulator 12 that has passed through the through hole 13B of the second insulator 13 are situated at the same height in the Z direction along the pair of outer lateral surfaces of the first insulator 12 and situated in the same plane (XY plane).

Even if a minute step is generated between the tip end surfaces, facing in the +Z direction, of the pair of wire conductors 21 and the tip end surface, facing in the +Z direction, of the body portion 12A of the first insulator 12 due to, for example, an edge shape of a cutting tool or elasticity difference between respective materials of the first insulator 12 and the wire conductors 21, the tip end surfaces of the body portion 12A of the first insulator 12 and the wire conductors 21 are situated in substantially the same plane and at close heights in the Z direction along the pair of outer lateral surfaces of the first insulator 12, since the body portion 12A and the wires W1 are cut by the same cutting tool in a single step.

Figure 17:
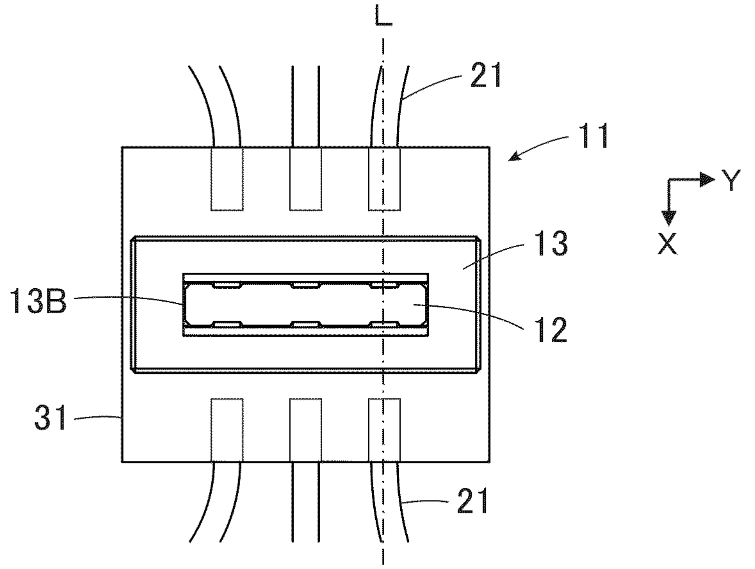
FIG. 17 is a plan view showing the connecting member of Embodiment 1.

In addition, since the three pairs of wire conductors 21 are formed as a result of cutting and removing middle parts of the three wires W1, as shown in FIG. 17, a pair of wire conductors 21 corresponding to each wire W1 extend on a single straight line L on both sides of the first insulator 12 in the X direction.

Figure 18:
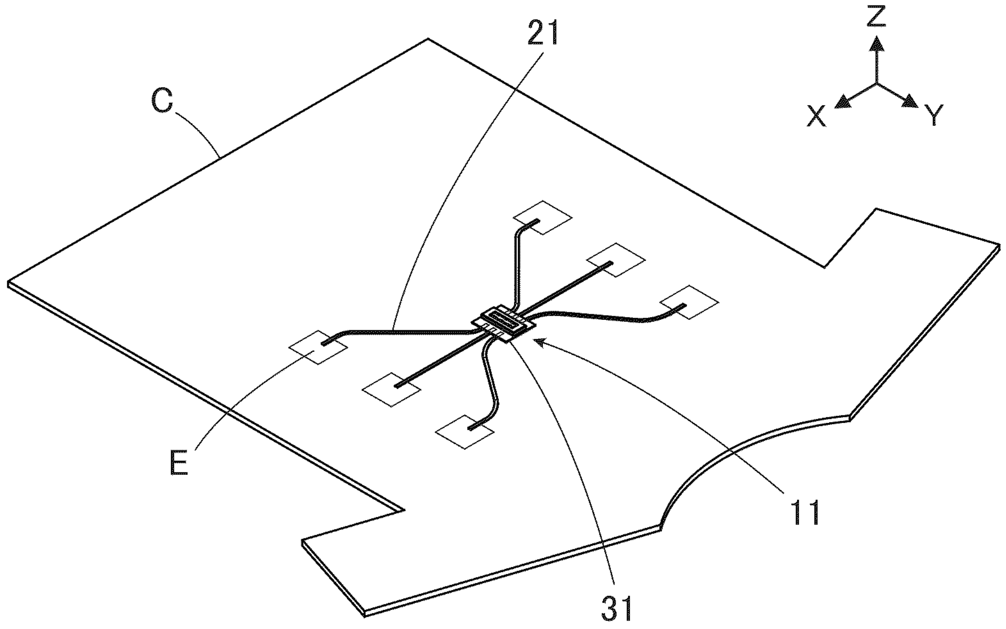
FIG. 18 is a perspective view showing the garment on which the connecting member according to Embodiment 1 is mounted.

FIG. 18 shows the garment C on which the connecting member 11 according to Embodiment 1 is mounted. Three pairs of the wire conductors 21 drawn from the connecting member 11 are separately connected to corresponding electrodes E.

Then, a circuit module (not shown) such as a measuring circuit or a wireless transmitting circuit is connected to the three pairs of the wire conductors 21 via the flexible substrate 31 disposed in the connecting member 11, whereby the user's biological data including the heart rate and the body temperature obtained using the electrodes E of the garment C can be transmitted to the circuit module, and the circuit module can perform various measurements or wirelessly transmit the biological data to a remote measurement device.

In Embodiment 1 described above, the connecting member 11 is assembled with the three wires W1 whose opposite end portions are separately connected to the electrodes E of the garment C as shown in FIG. 11; similarly, the connecting member 11 can be assembled with three wires W1 whose opposite end portions are not connected to the electrodes E of the garment C by using the first insulator 12, the second insulator 13, and the flexible substrate 31.

Figure 19:
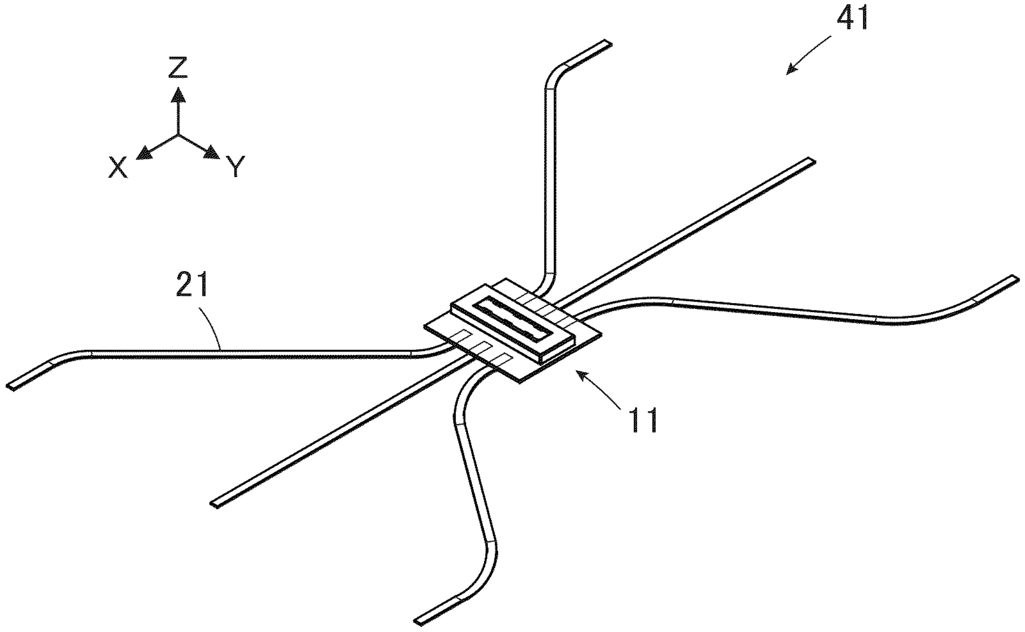
FIG. 19 is a perspective view showing a wiring member in which a plurality of wire conductors are connected to the connecting member of Embodiment 1.

A wiring member 41 in which the three pairs of wire conductors 21 are thus connected to the connecting member 11 is shown in FIG. 19. With use of the wiring member 41, it is possible to easily prepare the garment C which can obtain biological data by simply connecting end portions of the three pairs of the wire conductors 21 of the wiring member 41 to six electrodes E disposed on a surface of the garment C as shown in FIG. 10.

In the connecting member 11 according to Embodiment 1 described above, since three wires W1 are used, three pairs of wire conductors 21 are connected to three pairs of connecting conductors 34, but this is not the sole case. For instance, a connecting member can be configured such that with use of a single wire W1, a pair of wire conductors 21 are connected to a pair of connecting conductors 34, that two pairs of wire conductors 21 are connected to two pairs of connecting conductors 34, and even that four or more pairs of wire conductors 21 are connected to four or more pairs of connecting conductors 34.

Embodiment 2

Figure 20:
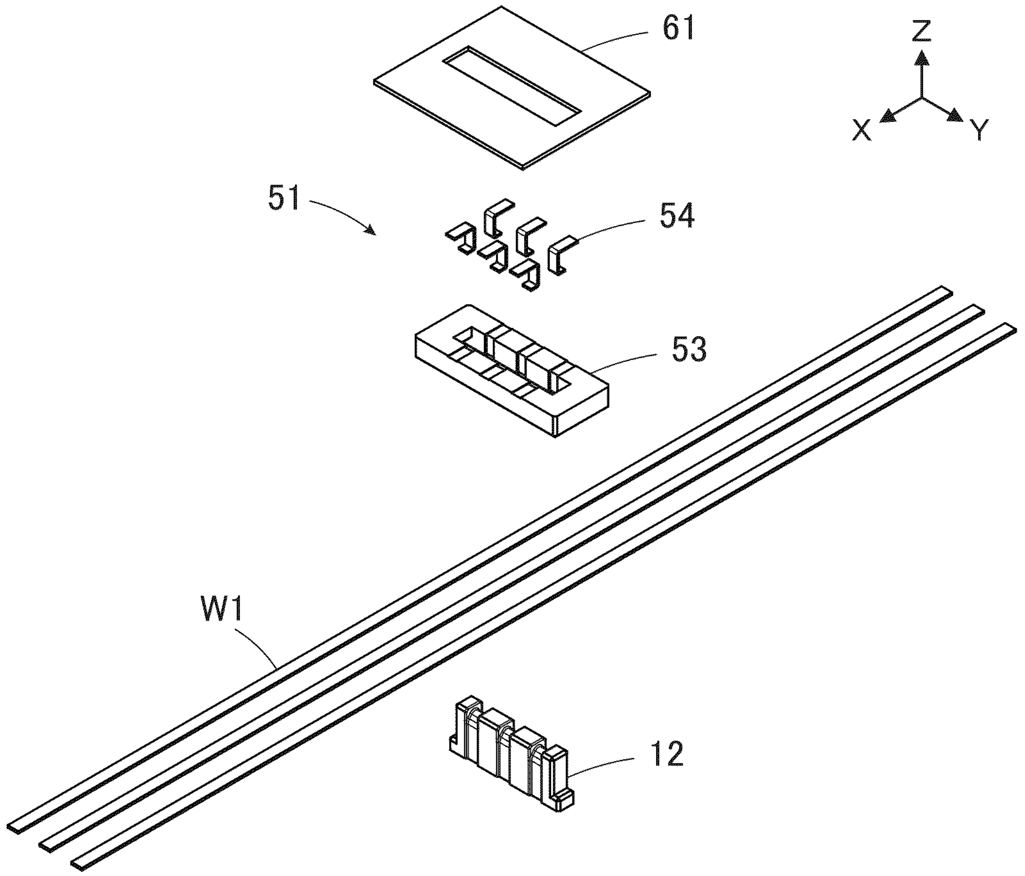
FIG. 20 is an assembly view of a connecting member according to Embodiment 2.

FIG. 20 shows an assembly view of a connecting member 51 according to Embodiment 2. The three wires W1 are disposed on the +Z direction side of the first insulator 12, a second insulator 53 is disposed on the +Z direction side of the three wires W1, three pairs of contacts 54 are disposed on the +Z direction side of the second insulator 53, and a flexible substrate 61 is disposed on the +Z direction side of the three pairs of contacts 54.

Two contacts 54 opposing each other in the X direction constitute each pair, and the three pairs of contacts 54 are aligned in the Y direction. In the connecting member 51, the second insulator 53 is fitted to the first insulator 12, the three pairs of contacts 54 are retained by the second insulator 53, and the flexible substrate 61 is retained by the three pairs of contacts 54.

The three wires W1 and the first insulator 12 are the same as those used in Embodiment 1.

Figure 21:
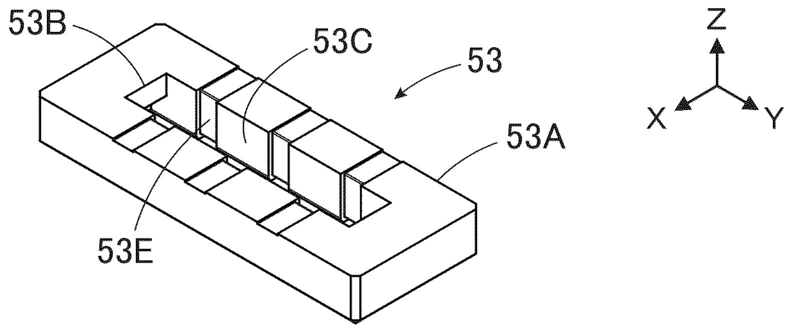
FIG. 21 is a perspective view of a second insulator used in the connecting member according to Embodiment 2 when viewed from an obliquely upper position.

As shown in FIG. 21, the second insulator 53 is made of, for example, an insulating resin, and includes a body portion 53A of flat plate shape extending along an XY plane. The body portion 53A is provided with a through hole 53B penetrating the body portion 53A in the Z direction and extending in the Y direction. The through hole 53B includes a pair of inner lateral surfaces 53C opposing each other in the X direction and each extending along a YZ plane.

Figure 22:
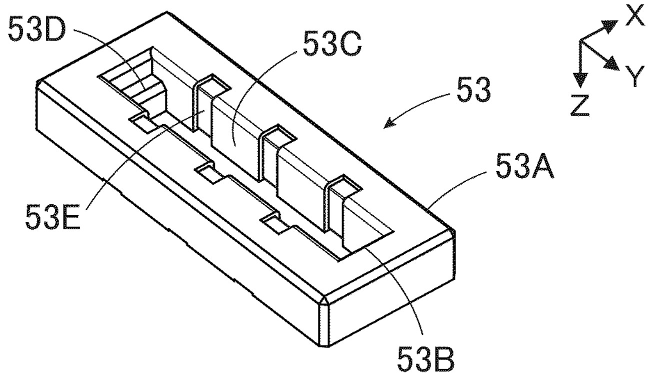
FIG. 22 is a perspective view of the second insulator used in the connecting member according to Embodiment 2 when viewed from an obliquely lower position.

As shown in FIG. 22, the body portion 53A is also provided with step portions 53D each facing in the −Z direction and separately formed at opposite ends in the Y direction of the through hole 53B.

In addition, as shown in FIGS. 21 and 22, three pairs of contact accommodation grooves 53E are formed to extend from the +Z directional surface of the body portion 53A to the −Z directional surface of the body portion 53A across the inner lateral surfaces 53C. The three pairs of contact accommodation grooves 53E consist of three contact accommodation grooves 53E aligned in the Y direction with predetermined intervals therebetween on the +X direction side of the through hole 53B and three contact accommodation grooves 53E aligned in the Y direction with predetermined intervals therebetween on the −X direction side of the through hole 53B.

Figure 23:
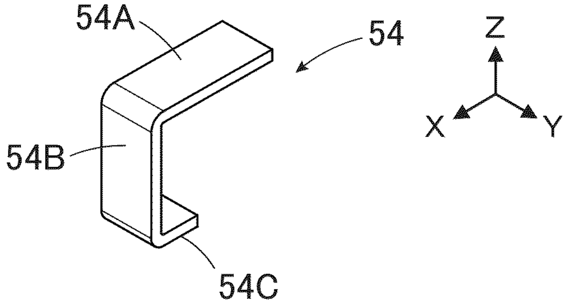
FIG. 23 is a perspective view showing a contact used in the connecting member of Embodiment 2.

FIG. 23 shows the configuration of one contact 54 of those aligned on the −X direction side among the three pairs of contacts 54 aligned in the Y direction. The contact 54 is formed of a bent band-shaped member made of a metal component, and includes a connecting portion 54A extending in the X direction along an XY plane, a contact portion 54B extending from the +X directional end of the connecting portion 54A in the −Z direction along a YZ plane, and a bent portion 54C extending from the −Z directional end of the contact portion 54B in the −X direction along an XY plane.

Note that, of the three pairs of contacts 54, the contacts 54 aligned on the +X direction side have the same configuration as that of the contact 54 shown in FIG. 23 but are disposed in the opposite orientation therefrom in the X direction.

Each contact 54 is retained by the second insulator 53 while being accommodated in the corresponding contact accommodation groove 53E of the body portion 53A of the second insulator 53 and constitutes a connecting conductor in the connecting member 51 of Embodiment 2.

The second insulator 53 retaining the three pairs of contacts 54 as above can be produced by, for example, insert molding.

Figure 24:
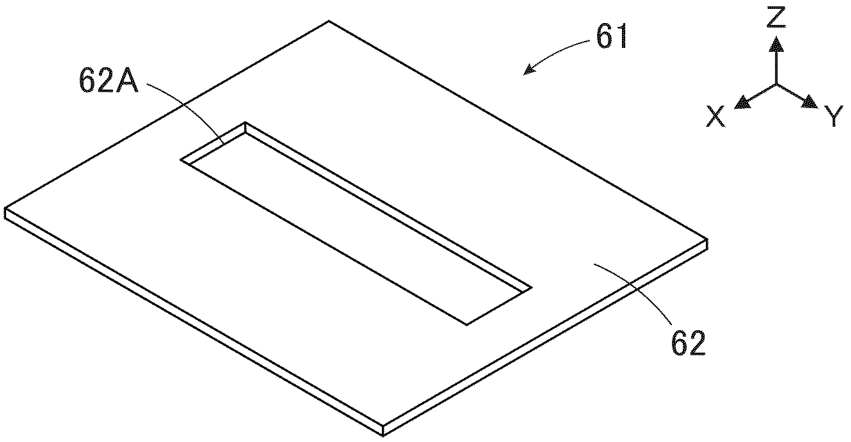
FIG. 24 is a perspective view of a flexible substrate used in the connecting member of Embodiment 2 when viewed from an obliquely upper position.
Figure 25:
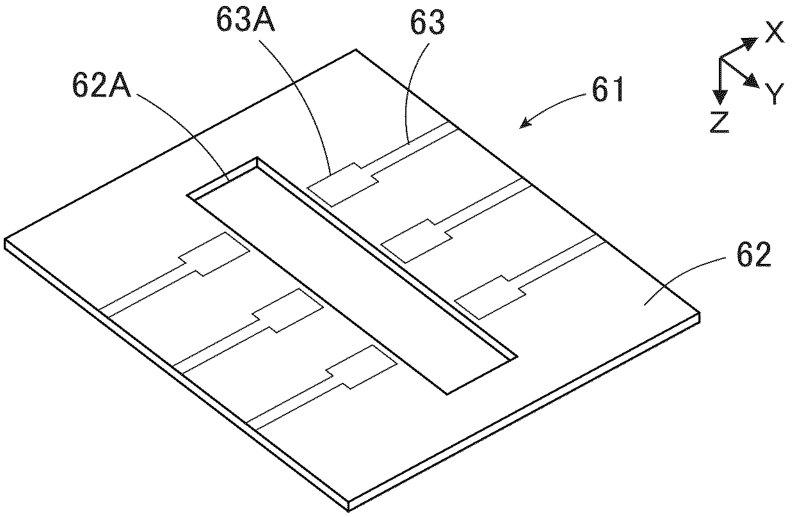
FIG. 25 is a perspective view of the flexible substrate used in the connecting member of Embodiment 2 when viewed from an obliquely lower position.

As shown in FIGS. 24 and 25, the flexible substrate 61 includes a flexible insulating base 62 of sheet shape, and the insulating base 62 is provided with a rectangular-shaped opening portion 62A extending long in the Y direction. The opening portion 62A corresponds to the through hole 53B of the second insulator 53.

The insulating base 62 is provided on its back surface facing in the −Z direction with three pairs of flexible conductors 63 each extending linearly in the X direction. Two flexible conductors 63 constituting each pair are separately disposed on the +X direction side and the −X direction side of the opening portion 62A across the opening portion 62A and each include a rectangular connecting pad 63A formed in the vicinity of the opening portion 62A.

When the connecting member 51 is assembled, the flexible substrate 61 is disposed on the +Z direction side of the second insulator 53 retaining the three pairs of contacts 54, and the connecting pads 63A of the three pairs of flexible conductors 63 of the flexible substrate 61 are each connected with the connecting portion 54A of the corresponding contact 54 by, for example, soldering.

Figure 26:
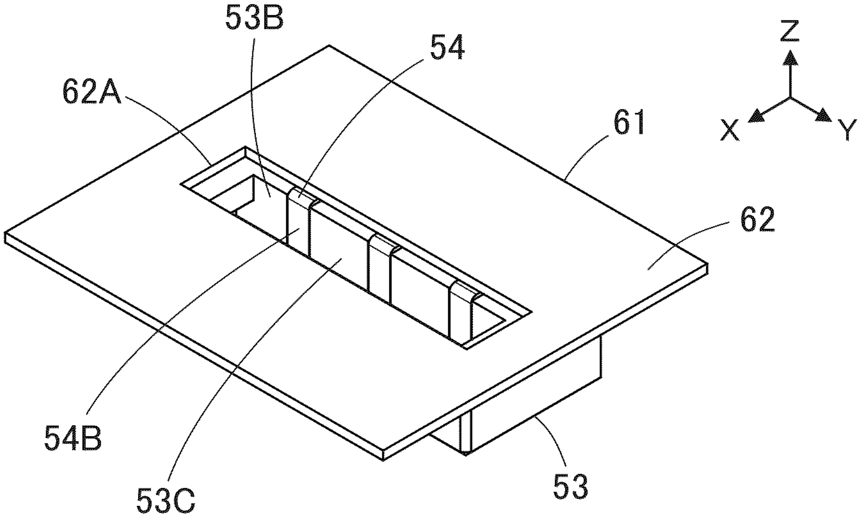
FIG. 26 is a perspective view of a state where the contacts and the flexible substrate are attached to the second insulator in the connecting member of Embodiment 2 when viewed from an obliquely upper position.
Figure 27:
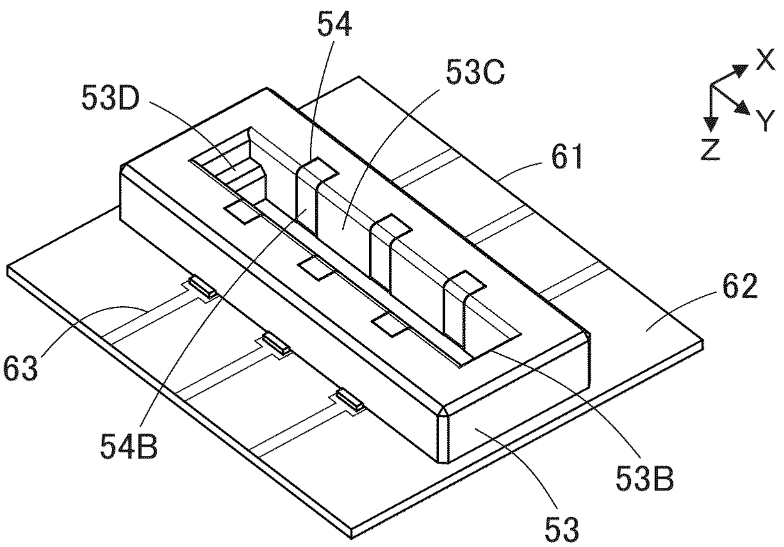
FIG. 27 is a perspective view of the state where the contacts and the flexible substrate are attached to the second insulator in the connecting member of Embodiment 2 when viewed from an obliquely lower position.

FIGS. 26 and 27 show the second insulator 53 to which the flexible substrate 61 is attached in this manner. The opening portion 62A of the flexible conductor 63 is situated on the +Z direction side of the through hole 53B of the second insulator 53. When the three pairs of contacts 54 are retained by the second insulator 53, the contact portions 54B of the three pairs of contacts 54 are exposed on the pair of inner lateral surfaces 53C of the through hole 53B of the second insulator 53.

For mounting the connecting member 51 according to Embodiment 2 on the garment C serving as a mounting object, similarly to Embodiment 1, as shown in FIGS. 12 and 13, the first insulator 12 is first inserted between the middle parts of the three wires W1 and the surface of the garment C, and the middle parts of the three wires W1 are bent to extend along the pair of outer lateral surfaces 12B of the body portion 12A of the first insulator 12 and are separately accommodated in the corresponding wire conductor accommodation grooves 12C of the body portion 12A.

In this state, the second insulator 53 is pressed in the −Z direction toward the first insulator 12 from the +Z direction side of the first insulator 12. As shown in FIGS. 26 and 27, the second insulator 53 has the flexible substrate 61 attached thereto.

Figure 28:
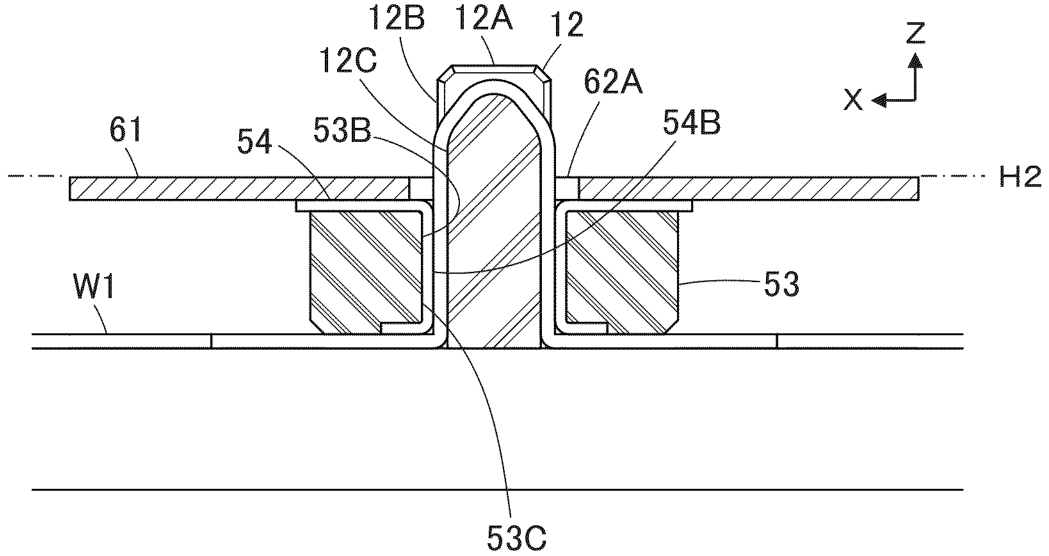
FIG. 28 is a cross-sectional view showing a state where the second insulator is fitted to the first insulator in Embodiment 2.

With this constitution, as shown in FIG. 28, the +Z directional part of the body portion 12A of the first insulator 12 passes through the through hole 53B of the second insulator 53 and the opening portion 62A of the flexible substrate 61 to protrude on the +Z direction side of the flexible substrate 61.

Since the step portions 53D of the second insulator 53 shown in FIG. 22 abut onto the projections 12D of the first insulator 12 shown in FIG. 3, the position of the second insulator 53 in the Z direction with respect to the first insulator 12 is restricted, and the second insulator 53 is fitted to the first insulator 12.

At this time, the contact portions 54B of the three pairs of contacts 54 are exposed on the pair of inner lateral surfaces 53C of the through hole 53B of the second insulator 53. With this constitution, the middle part of each wire W1 is sandwiched between the pair of outer lateral surfaces 12B of the body portion 12A of the first insulator 12 and the contact portions 54B of the pair of contacts 54 exposed on the pair of inner lateral surfaces 53C of the through hole 53B of the second insulator 53, makes contact with the contact portions 54B of the pair of contacts 54 with a predetermined contact pressure, and is electrically connected to the pair of contacts 54.

In this state, the body portion 12A of the first insulator 12 and the middle parts of the three wires W1 that are bent to extend along the pair of outer lateral surfaces 12B of the body portion 12A are cut at a height H2 of the +Z directional surface of the flexible substrate 61 in a single step by using a nipper or another cutting tool.

The +Z directional part of the body portion 12A of the first insulator 12 and the middle parts of the three wires W1 protruding on the +Z direction side of the flexible substrate 61 are cut and removed in this manner, and the connecting member 51 is thus assembled.

Figure 29:
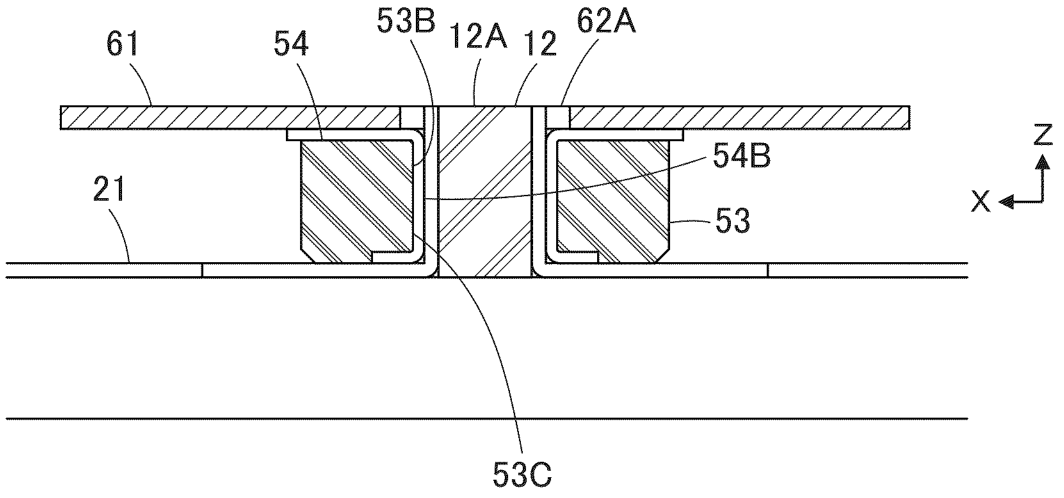
FIG. 29 is a cross-sectional view showing the connecting member of Embodiment 2.

Since the middle parts of the three wires W1 bent to extend along the pair of outer lateral surfaces 12B of the body portion 12A of the first insulator 12 and protruding on the +Z direction side of the flexible substrate 61 are cut and removed, the three wires W1 are each divided into two halves separately situated on the +X direction side and the −X direction side of the first insulator 12 to thereby form the wire conductor 21 disposed on the +X direction side of the first insulator 12 and the wire conductor 21 disposed on the −X direction side of the first insulator 12 as shown in FIG. 29. In other words, three pairs of the wire conductors 21 are formed.

The wire conductors 21 disposed on the +X direction side are electrically connected to the contact portions 54B of the contacts 54 exposed on the +X directional inner lateral surface 53C of the through hole 53B of the second insulator 53, and the wire conductors 21 disposed on the −X direction side are electrically connected to the contact portions 54B of the contacts 54 exposed on the −X directional inner lateral surface 53C of the through hole 53B of the second insulator 53.

By using the three wires W1 to assemble the connecting member 51 as described above, three pairs of the contacts 54 can be electrically connected to three pairs of the wire conductors 21 with ease.

Since the +Z directional part of the body portion 12A of the first insulator 12 and middle parts of the three wires W1 protruding on the +Z direction side of the flexible substrate 61 are cut and removed, as shown in FIG. 29, tip end surfaces, facing in the +Z direction, of the pair of wire conductors 21 and a tip end surface, facing in the +Z direction, of the body portion 12A of the first insulator 12 that has passed through the through hole 53B of the second insulator 53 and the opening portion 62A of the flexible substrate 61 are situated at the same height in the Z direction along the pair of outer lateral surfaces of the first insulator 12 and situated in the same plane (XY plane).

Even if a minute step is generated between the tip end surfaces, facing in the +Z direction, of the pair of wire conductors 21 and the tip end surface, facing in the +Z direction, of the body portion 12A of the first insulator 12 due to, for example, an edge shape of a cutting tool or elasticity difference between respective materials of the first insulator 12 and the wire conductors 21, the tip end surfaces of the body portion 12A of the first insulator 12 and the wire conductors 21 are situated in substantially the same plane and at close heights in the Z direction along the pair of outer lateral surfaces of the first insulator 12, since the body portion 12A and the wires W1 are cut by the same cutting tool in a single step.

Embodiment 3

Figure 30:
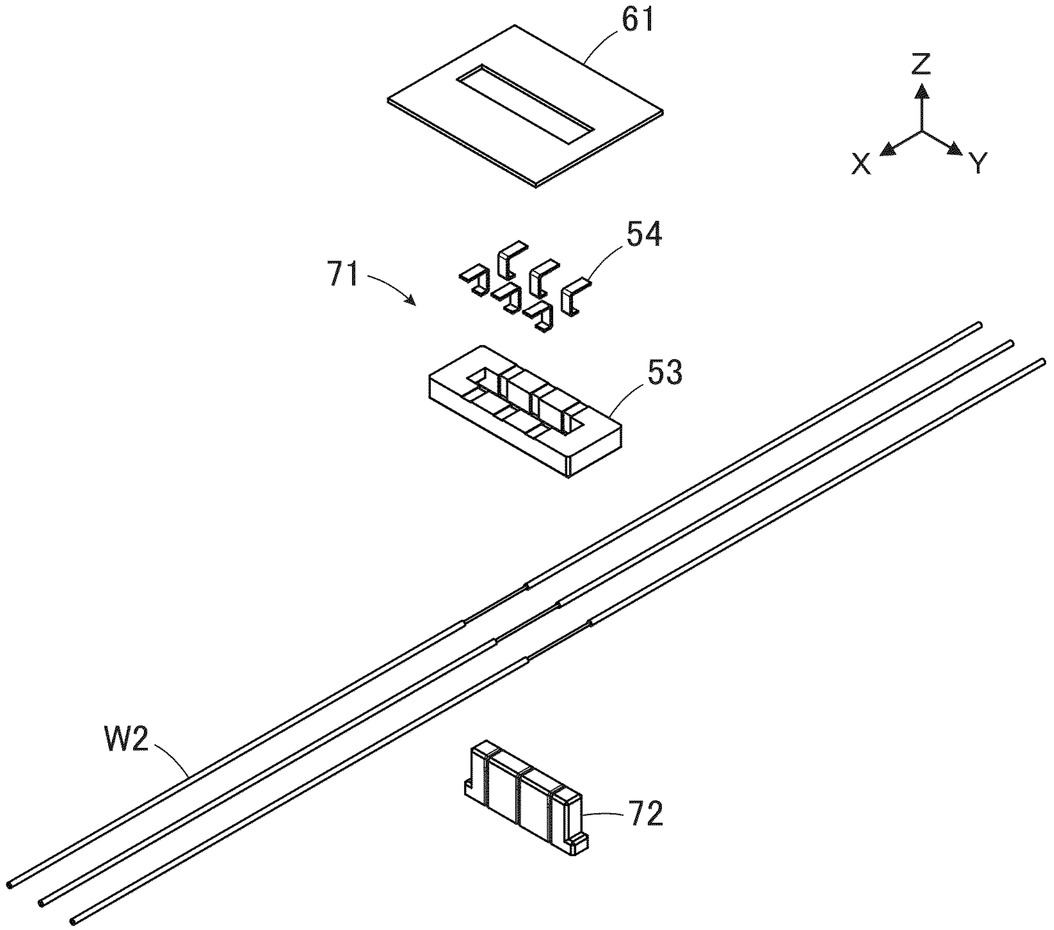
FIG. 30 is an assembly view of a connecting member according to Embodiment 3.

FIG. 30 shows an assembly view of a connecting member 71 according to Embodiment 3. The three wires W2 are disposed on the +Z direction side of a first insulator 72, the second insulator 53 is disposed on the +Z direction side of the three wires W2, three pairs of contacts 54 are disposed on the +Z direction side of the second insulator 53, and the flexible substrate 61 is disposed on the +Z direction side of the three pairs of contacts 54.

The second insulator 53, the three pairs of contacts 54, and the flexible substrate 61 are the same as those used in Embodiment 2.

Figure 31:
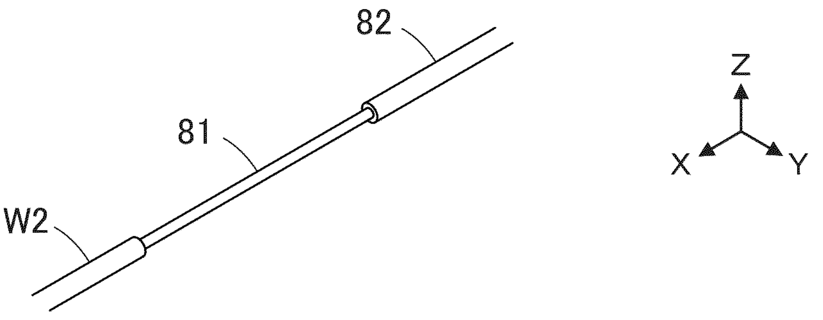
FIG. 31 is an enlarged partial perspective view showing a wire used in the connecting member of Embodiment 3.

While the wire W1 used in Embodiment 1 is made of, for instance, a fibrous wire formed from a conductive thread woven or knitted therein, in Embodiment 3, used as a wire W2 is a coated wire configured such that an outer periphery of a conductor portion 81 is covered by an insulating coating portion 82 as shown in FIG. 31. The conductor portion 81 may be either a so-called solid wire constituted of one conductor or a so-called stranded wire constituted of plural conductors being stranded.

Figure 32:
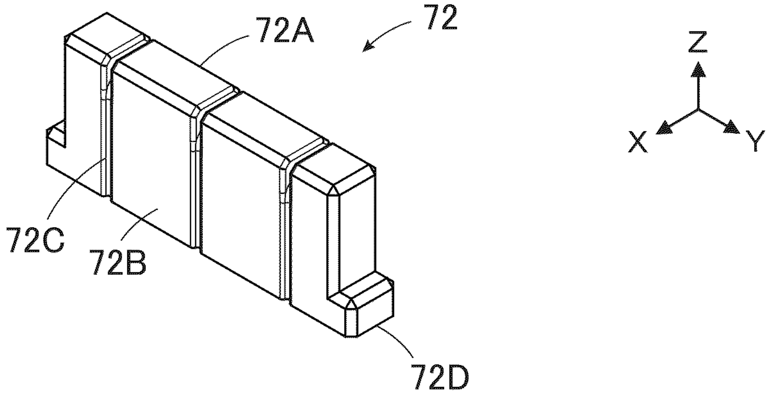
FIG. 32 is a perspective view showing a first insulator used in the connecting member of Embodiment 3.

As shown in FIG. 32, the first insulator 72 is made of, for example, an insulating resin, and includes a body portion 72A of flat plate shape extending in the +Z direction along a YZ plane. The body portion 72A includes a pair of outer lateral surfaces 72B separately facing in the +X direction and the −X direction, and three wire conductor accommodation grooves 72C are formed in the pair of outer lateral surfaces 72B, the wire conductor accommodation grooves 72C being aligned in the Y direction with predetermined intervals therebetween and each extending along the Z direction. The wire conductor accommodation grooves 72C accommodate the conductor portions 81 of the wires W2 when the connecting member 71 is assembled and each have a groove width corresponding to the diameter of the conductor portion 81 and a groove depth smaller than the diameter of the conductor portion 81.

In addition, the body portion 72A is provided, at opposite end surfaces in the Y direction and at the −Z directional end, separately with projections 72D projecting in the Y direction.

For mounting the connecting member 71 according to Embodiment 3 on the garment C serving as a mounting object, first, the insulating coating portion 82 is partly removed to thereby have the conductor portion 81 exposed at a middle part of each wire W2 as shown in FIG. 31.

Subsequently, the first insulator 72 is inserted between the conductor portions 81 exposed at middle parts of the three wires W2 and the surface of the garment C, and the conductor portions 81 of the three wires W2 are bent to extend along the pair of outer lateral surfaces 72B of the body portion 72A of the first insulator 72 and are separately accommodated in the corresponding wire conductor accommodation grooves 72C of the body portion 72A.

Similarly to Embodiment 2, the flexible substrate 61 is attached to the second insulator 53 as shown in FIGS. 26 and 27.

In this state, the second insulator 53 is pressed in the −Z direction toward the first insulator 72 from the +Z direction side of the first insulator 72.

Figure 33:
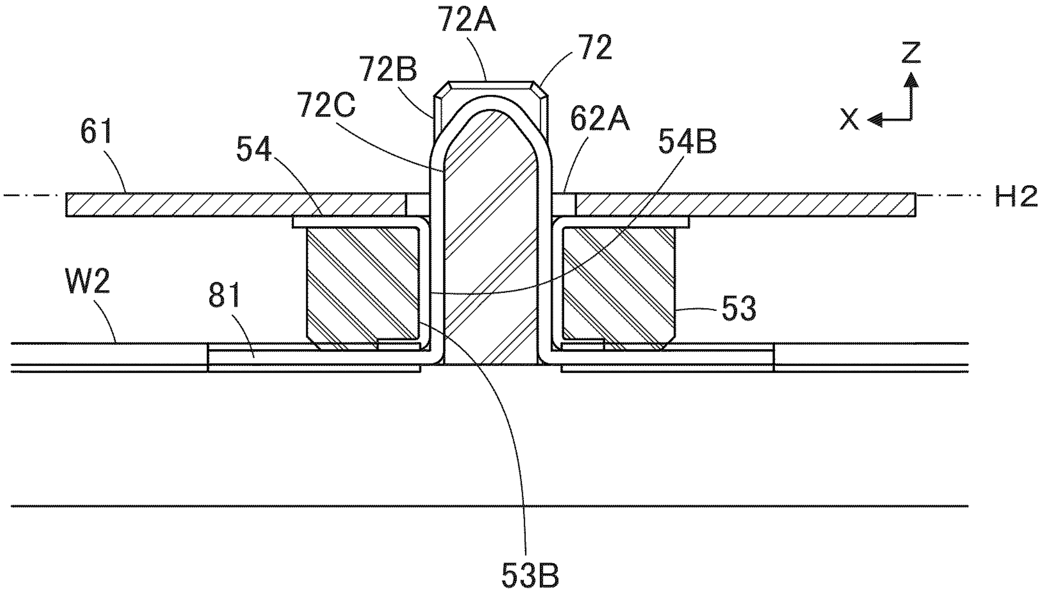
FIG. 33 is a cross-sectional view showing a state where the second insulator is fitted to the first insulator in Embodiment 3.

With this constitution, as shown in FIG. 33, the +Z directional part of the body portion 72A of the first insulator 72 passes through the through hole 53B of the second insulator 53 and the opening portion 62A of the flexible substrate 61 to protrude on the +Z direction side of the flexible substrate 61.

Since the step portions 53D of the second insulator 53 shown in FIG. 22 abut onto the projections 72D of the first insulator 72 shown in FIG. 32, the position of the second insulator 53 in the Z direction with respect to the first insulator 72 is restricted, and the second insulator 53 is fitted to the first insulator 72.

At this time, the contact portions 54B of the three pairs of contacts 54 are exposed on the pair of inner lateral surfaces 53C of the through hole 53B of the second insulator 53. With this constitution, the conductor portion 81 exposed at the middle part of each wire W2 and accommodated in the corresponding wire conductor accommodation groove 72C of the body portion 72A of the first insulator 72 is sandwiched between the pair of outer lateral surfaces 72B of the body portion 72A of the first insulator 72 and the contact portions 54B of the pair of contacts 54 exposed on the pair of inner lateral surfaces 53C of the through hole 53B of the second insulator 53, makes contact with the contact portions 54B of the pair of contacts 54 with a predetermined contact pressure, and is electrically connected to the pair of contacts 54.

In this state, the body portion 72A of the first insulator 72 and the conductor portions 81 at the middle parts of the three wires W2 that are bent to extend along the pair of outer lateral surfaces 72B of the body portion 72A are cut at the height H2 of the +Z directional surface of the flexible substrate 61 in a single step by using a nipper or another cutting tool.

The +Z directional part of the body portion 72A of the first insulator 72 and the conductor portions 81 at the middle parts of the three wires W2 protruding on the +Z direction side of the flexible substrate 61 are cut and removed in this manner, and the connecting member 71 is thus assembled.

Figure 34:
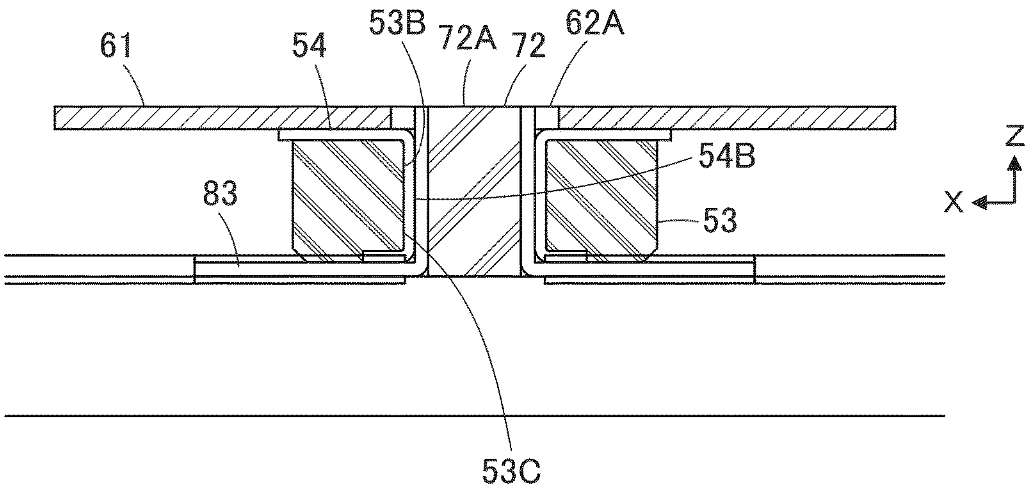
FIG. 34 is a cross-sectional view showing the connecting member of Embodiment 3.
Figure 35:
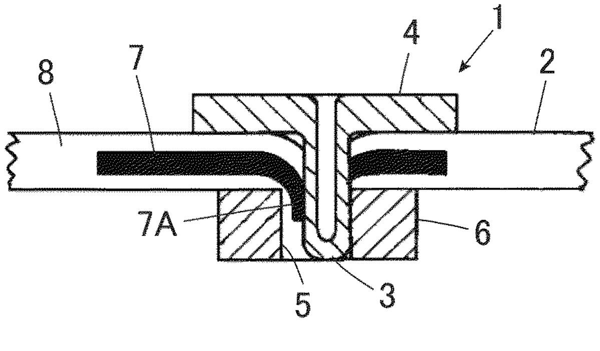
FIG. 35 PRIOR ART
FIG. 35 is a cross-sectional view showing a conventional connector mounted on a flat cable.

Since the conductor portions 81 at the middle parts of the three wires W2 bent to extend along the pair of outer lateral surfaces 72B of the body portion 72A of the first insulator 72 and protruding on the +Z direction side of the flexible substrate 61 are cut and removed, the three wires W2 are each divided into two halves separately situated on the +X direction side and the −X direction side of the first insulator 72 to thereby form a wire conductor 83 disposed on the +X direction side of the first insulator 72 and a wire conductor 83 disposed on the −X direction side of the first insulator 72 as shown in FIG. 34. In other words, three pairs of the wire conductors 83 are formed.

The wire conductors 83 disposed on the +X direction side are electrically connected to the contact portions 54B of the contacts 54 exposed on the +X directional inner lateral surface 53C of the through hole 53B of the second insulator 53, and the wire conductors 83 disposed on the −X direction side are electrically connected to the contact portions 54B of the contacts 54 exposed on the −X directional inner lateral surface 53C of the through hole 53B of the second insulator 53.

By using the three wires W2 to assemble the connecting member 71 as described above, three pairs of the contacts 54 can be electrically connected to three pairs of the wire conductors 83 with ease.

Since the +Z directional part of the body portion 72A of the first insulator 72 and middle parts of the three wires W2 protruding on the +Z direction side of the flexible substrate 61 are cut and removed, as shown in FIG. 34, tip end surfaces, facing in the +Z direction, of the pair of wire conductors 83 and a tip end surface, facing in the +Z direction, of the body portion 72A of the first insulator 72 that has passed through the through hole 53B of the second insulator 53 and the opening portion 62A of the flexible substrate 61 are situated at the same height in the Z direction along the pair of outer lateral surfaces of the first insulator 72 and situated in the same plane (XY plane).

Even if a minute step is generated between the tip end surfaces, facing in the +Z direction, of the pair of wire conductors 83 and the tip end surface, facing in the +Z direction, of the body portion 72A of the first insulator 72 due to, for example, an edge shape of a cutting tool or elasticity difference between respective materials of the first insulator 72 and the wire conductors 83, the tip end surfaces of the body portion 72A of the first insulator 72 and the wire conductors 83 are situated in substantially the same plane and at close heights in the Z direction along the pair of outer lateral surfaces of the first insulator 72, since the body portion 72A and the wires W2 are cut by the same cutting tool in a single step.

While the flexible substrate 61 is attached to the second insulator 53 in Embodiments 2 and 3 described above, the flexible substrate 61 is not folded into, for example, the through hole 53B of the second insulator 53, and hence it is possible to attach, in place of the flexible substrate 61, a non-flexible, so-called rigid substrate to the second insulator 53.

In addition, while in Embodiments 1 to 3 described above, the connecting member 11, 51, 71 is mounted on the garment C serving as the mounting object, the mounting object is not limited to the garment C; for instance, the connecting member 11, 51, 71 can be mounted on a seat, a bed, or a bedding piece in or on which the user lies, a bag or the like that the user carries or wears, or other goods with or to which the user's body directly or indirectly makes contact or is closely situated.

What is claimed is:

1. A connecting member mounted on a mounting object and electrically connecting a pair of wire conductors disposed along a surface of the mounting object to a pair of connecting conductors, the connecting member comprising:

a first insulator disposed on the surface of the mounting object and including a pair of outer lateral surfaces separately facing in opposite directions from each other along the surface of the mounting object;

a second insulator including a through hole through which at least part of the first insulator passes; and the pair of connecting conductors retained by the second insulator, wherein the through hole of the second insulator includes a pair of inner lateral surfaces opposing the pair of outer lateral surfaces of the first insulator, the pair of connecting conductors are exposed on the pair of inner lateral surfaces of the through hole, the pair of wire conductors are bent to extend along the pair of outer lateral surfaces of the first insulator and are sandwiched between the pair of outer lateral surfaces of the first insulator and the pair of connecting conductors exposed on the pair of inner lateral surfaces of the through hole of the second insulator to be thereby electrically connected to the pair of connecting conductors, and tip end surfaces of the pair of wire conductors that are bent to extend along the pair of outer lateral surfaces of the first insulator and a tip end surface of the first insulator that has passed through the through hole of the second insulator are situated at a same height or close heights to each other in a direction along the pair of outer lateral surfaces of the first insulator.

2. The connecting member according to claim 1, wherein the pair of connecting conductors are formed of a pair of flexible conductors exposed on a surface of a flexible substrate that extends along a surface of the mounting object, and part of the flexible substrate is bent to extend along the pair of inner lateral surfaces of the through hole, and the pair of flexible conductors on the flexible substrate that are bent are electrically connected to the pair of wire conductors on opposite sides of the first insulator.

3. The connecting member according to claim 1, wherein the pair of connecting conductors are formed of a pair of contacts each made of a metal component, and the pair of contacts are disposed such that parts thereof extend along the pair of inner lateral surfaces of the through hole, and the pair of contacts are electrically connected to the pair of wire conductors on opposite sides of the first insulator.

4. The connecting member according to claim 3, comprising a flexible substrate having a pair of flexible conductors exposed on a surface thereof, wherein the pair of contacts are soldered to the pair of flexible conductors of the flexible substrate.

5. The connecting member according to claim 1, wherein the first insulator includes a pair of wire conductor accommodation grooves formed in the pair of outer lateral surfaces to accommodate the pair of wire conductors.

6. The connecting member according to claim 1, wherein the pair of wire conductors extend on a single straight line on both sides of the first insulator.

7. The connecting member according to claim 1, comprising a plurality of pairs of the connecting conductors retained by the second insulator and exposed on the pair of inner lateral surfaces of the through hole, wherein a plurality of pairs of the wire conductors are bent to extend along the pair of outer lateral surfaces of the first insulator and sandwiched between the pair of outer lateral surfaces of the first insulator and the plurality of pairs of the connecting conductors exposed on the pair of inner lateral surfaces of the through hole of the second insulator to be thereby electrically connected to the plurality of pairs of the connecting conductors.

8. A wiring member mounted on a mounting object, the wiring member comprising:

at least a pair of wire conductors; and the connecting member according to claim 1.

9. The wiring member according to claim 8, wherein the at least a pair of wire conductors are formed of wires using conductive fibers, or of electric wires.

10. A garment serving as the mounting object on which the wiring member according to claim 8 is mounted.

11. The garment according to claim 10, on which at least a pair of electrodes are disposed, wherein the at least a pair of wire conductors are connected to the at least a pair of electrodes.

12. A connecting method for electrically connecting a pair of wire conductors disposed along a surface of a mounting object to a pair of connecting conductors, the connecting method comprising:

disposing a wire along the surface of the mounting object;

disposing a first insulator between the surface of the mounting object and a middle part of the wire, the first insulator including a pair of outer lateral surfaces separately facing in opposite directions from each other along the surface of the mounting object;

bending the middle part of the wire to extend along the pair of outer lateral surfaces of the first insulator;

fitting a second insulator to the first insulator such that the middle part of the wire that is bent and part of the first insulator pass through and protrude from a through hole of the second insulator, whereby the middle part of the wire is sandwiched between the pair of outer lateral surfaces of the first insulator and the pair of connecting conductors exposed on a pair of inner lateral surfaces of the through hole of the second insulator to make contact with the pair of connecting conductors; and cutting and removing the middle part of the wire and the part of the first insulator protruding from the through hole of the second insulator, whereby the wire is divided into two halves to form the pair of wire conductors, and the pair of wire conductors are electrically connected to the pair of connecting conductors.

* * * * *